United States Patent
Richardson et al.

(10) Patent No.: US 9,976,599 B2
(45) Date of Patent: May 22, 2018

(54) COUNTERSUNK THREADED BEARING AND METHOD OF INSTALLATION

(71) Applicant: The Boeing Company, Chicago, IL (US)

(72) Inventors: Forrest E. Richardson, Wichita, KS (US); Lance A. Cutler, Yukon, OK (US)

(73) Assignee: The Boeing Company, Chicago, IL (US)

( * ) Notice: Subject to any disclaimer, the term of this patent is extended or adjusted under 35 U.S.C. 154(b) by 0 days. days.

(21) Appl. No.: 15/193,671

(22) Filed: Jun. 27, 2016

(65) Prior Publication Data

US 2017/0370417 A1    Dec. 28, 2017

(51) Int. Cl.
*F16C 35/067*  (2006.01)
*F16C 19/26*  (2006.01)
*F16C 19/06*  (2006.01)
*F16C 33/58*  (2006.01)

(52) U.S. Cl.
CPC ............ *F16C 35/067* (2013.01); *F16C 19/06* (2013.01); *F16C 19/26* (2013.01); *F16C 33/586* (2013.01); *F16C 2326/43* (2013.01)

(58) Field of Classification Search
CPC ...... F16C 23/086; F16C 33/586; F16C 35/02; F16C 35/067
See application file for complete search history.

(56) References Cited

U.S. PATENT DOCUMENTS

| | | | | |
|---|---|---|---|---|
| 3,516,136 A | * | 6/1970 | Carter | F16C 23/045 29/441.1 |
| 4,248,487 A | * | 2/1981 | Asberg | F16C 23/06 384/494 |
| 4,319,788 A | * | 3/1982 | Hackman | F16C 23/045 29/898.03 |
| 5,507,580 A | * | 4/1996 | Dezzani | C21D 9/40 384/492 |
| 9,227,280 B2 | | 1/2016 | Howard | |
| 9,366,296 B2 | * | 6/2016 | Abrudan | B23P 15/003 |
| 2015/0198204 A1 | * | 7/2015 | Abrudan | B23P 15/003 384/210 |

FOREIGN PATENT DOCUMENTS

FR    2137330 A2    12/1972
GB    1210728 A    10/1970

OTHER PUBLICATIONS

EPO, European Search Report for application No. 17163320.9, dated Sep. 21, 2017.

* cited by examiner

Primary Examiner — James Pilkington

(57) ABSTRACT

A bearing assembly includes an outer race, an inner race, a bearing interface, and a nut. The outer race has a head end and a base end. The head end includes a flange having a countersink lip formed on an underside of the flange. The outer race includes an externally threaded portion terminating at the base end. The inner race is circumscribed by the outer race. The bearing interface is located between and rotatably couples the inner race to the outer race. The nut is configured to be threadably engaged to the externally threaded portion.

15 Claims, 6 Drawing Sheets

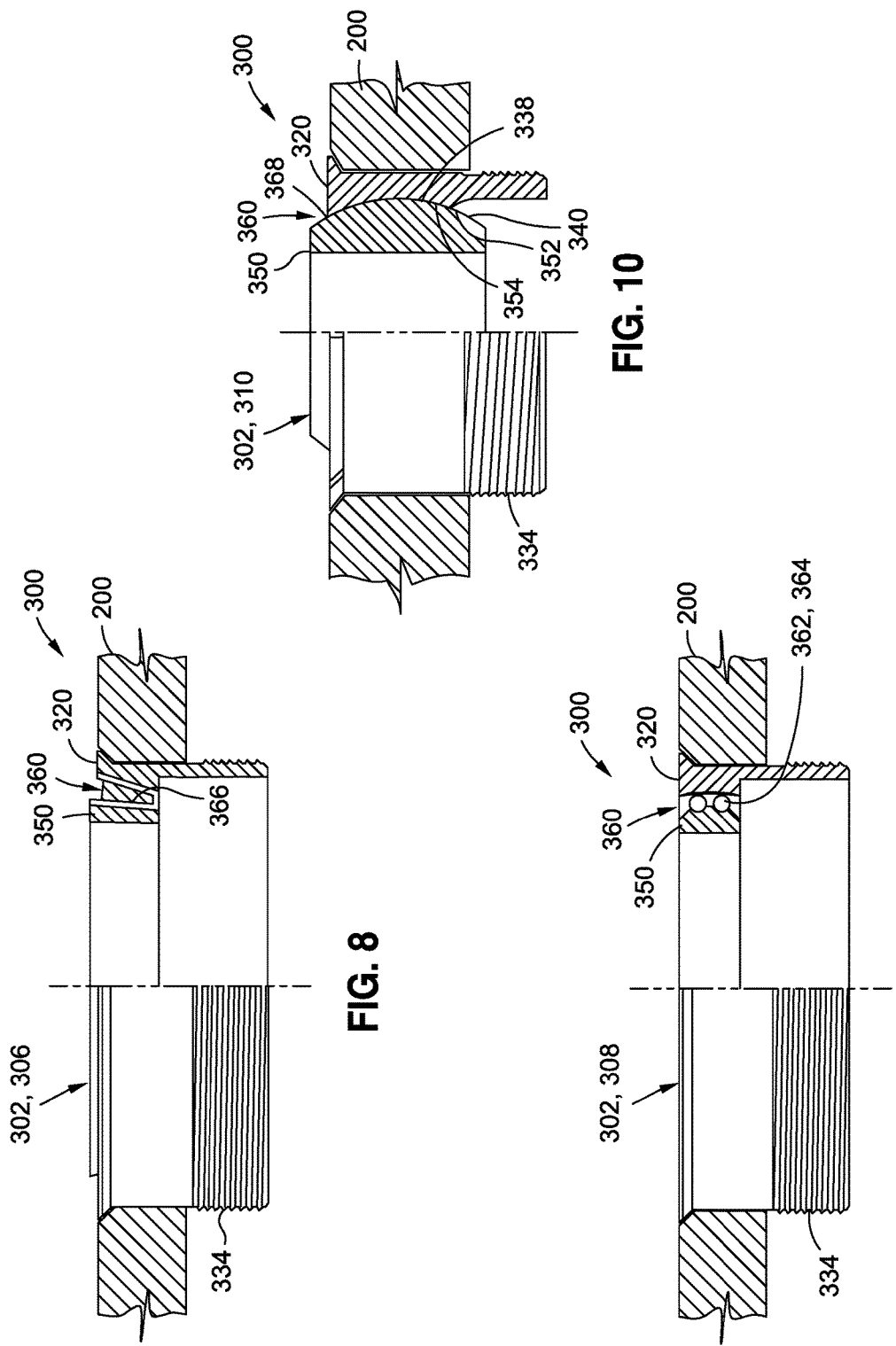

COUNTERSUNK THREADED BEARING AND METHOD OF INSTALLATION

FIELD

The present disclosure relates to bearings and, more particularly, to a bearing assembly that eliminates the need for interference fit or staking during installation of the bearing assembly in a structural component.

BACKGROUND

Bearings are used in a wide variety of applications to allow for relative rotational motion between two components with minimal resistance. Conventional bearing installations typically require a shoulder in the hole of a structure into which the bearing is installed to provide a surface against which the bearing may bottom out during installation. Unfortunately, the fabrication of the shoulder in the hole increases manufacturing costs and adds complexity to the installation process.

Conventional bearings additionally require an interference fit and/or the displacement of material during installation. The displacement of material during a conventional bearing installation may include the swaging or staking of the balls or rollers of the bearing. Unfortunately, the interference fit and/or material displacement adds to the complexity of installation. In addition, replacement of a press-fit bearing may result in damage to the hole and/or the bearing to the point that the hole or the bearing may not be reusable, or the hole or bearing may require rework.

Conventional flanged bearings require a flat surface in the area surrounding the hole to support the flange of the bearing during installation. Unfortunately, some structures may have a sloped surface (e.g., due to draft angles on castings or forgings) surrounding the hole. A sloped surface surrounding a hole may prevent the installation of a flanged bearing. In addition, a lack of accessibility to the area surrounding a hole may present challenges for forming a flat surface around the hole to support the flange of the bearing.

As can be seen, there exists a need in the art for a bearing assembly that can be installed in the hole of a structure without the need for press-fitting or material displacement, and which is nondependent on the availability of a flat surface in the area of the structure surrounding the hole.

SUMMARY

The above-noted needs associated with bearing installations are specifically addressed and alleviated by the present disclosure which provides a bearing assembly having an outer race, an inner race, a bearing interface, and a nut. The outer race has a head end and a base end. The head end includes a flange having a countersink lip formed on an underside of the flange for seating against a countersink profile of a structural hole. The outer race includes an externally threaded portion terminating at the base end. The inner race is circumscribed by the outer race. The bearing interface is located between and rotatably couple's the inner race to the outer race. The nut is configured to be threadably engaged to the externally threaded portion to retain the bearing assembly in the structural hole.

Also disclosed is a bearing installation of a bearing assembly into a structural hole of a structural component. The structural hole has a countersink profile formed on an edge of the structural hole on a front side of the structural component. The bearing assembly includes an outer race having a head end and a base end. The head end includes a flange having a countersink lip formed on an underside of the flange. The outer race includes an externally threaded portion terminating at the base end. The bearing assembly further includes an inner race circumscribed by the outer race. The bearing assembly also includes a bearing interface rotatably coupling the inner race to the outer race. A nut is threadably engaged to the externally threaded portion on the back side of the structural component.

In addition, disclosed is a method of installing a bearing assembly in a structural component. The method includes inserting a bearing assembly into a structural hole such that a countersink lip of an outer race is seated on a countersink profile of the structural hole and such that a base end of the outer race protrudes beyond a back side of the structural hole. The bearing assembly has a bearing interface coupling an inner race to the outer race. The method additionally includes threadably engaging a nut onto an externally threaded portion of the outer race protruding beyond a back side of the structural component.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 8 is a partial sectional view of a tapered bearing configuration of the presently-disclosed bearing assembly;

FIG. 9 is a perspective view of a self-aligning bearing configuration of the presently-disclosed bearing assembly;

FIG. 10 is a partial sectional view of a spherical bearing configuration of the present-disclosed bearing assembly.

DETAILED DESCRIPTION

Figure 1:
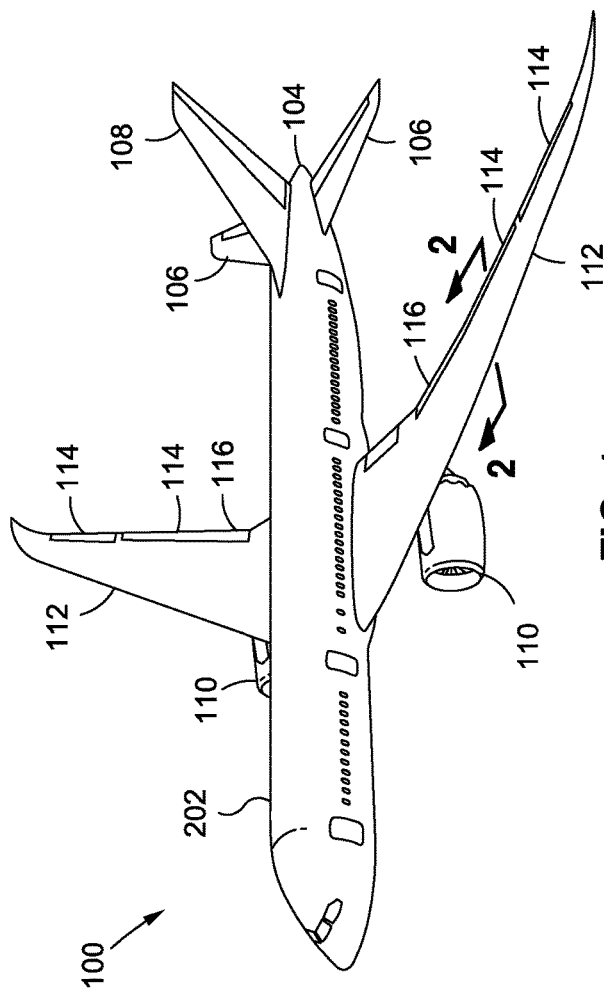
FIG. 1 is a perspective illustration of an aircraft.

Referring now to the drawings wherein the showings are for purposes of illustrating various embodiments of the present disclosure, shown in FIG. 1 is an illustration of an aircraft 100 which may incorporate one or more examples of the bearing assembly 302 disclosed herein. The aircraft 100 may include a fuselage 102 extending from the nose to an empennage 104 at the aft end of the fuselage 102. The empennage 104 may include a vertical tail 108 and one or more horizontal tails 106. The aircraft 100 may further include a pair of wings 112 extending outwardly from the fuselage 102 and including flight control surfaces 114. The aircraft 100 may also include one or more propulsion units 110.

Figure 2:
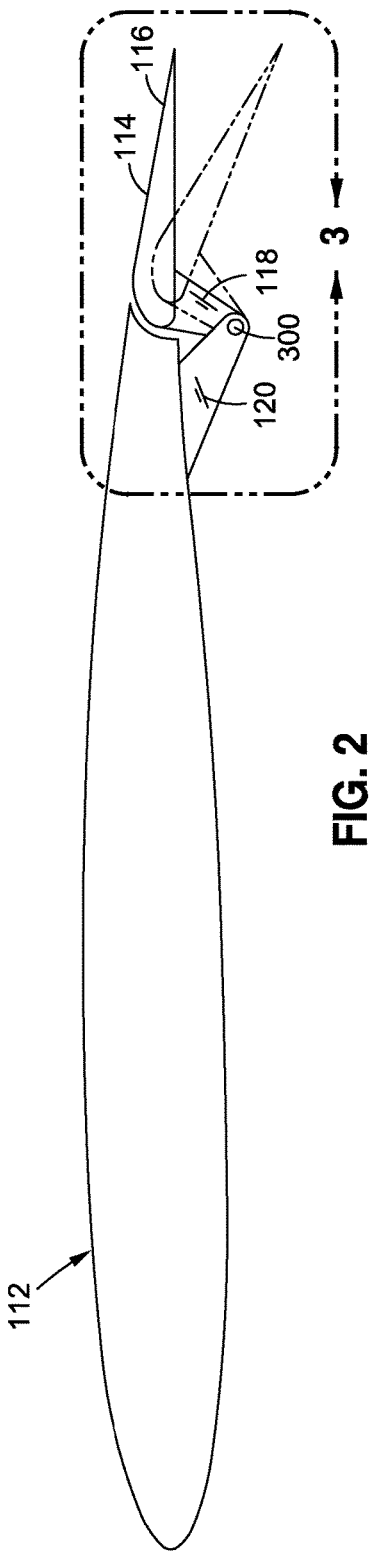
FIG. 2 is a sectional view of a wing taken along line 2 of FIG. 1 and showing a flap pivotably coupled to the wing.
Figure 3:
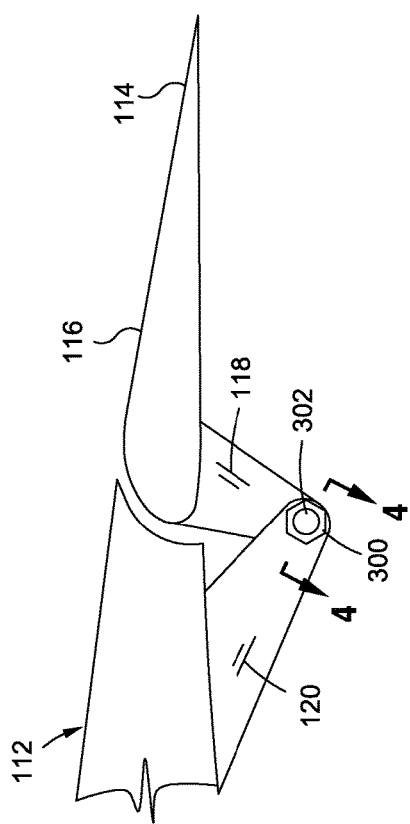
FIG. 3 is a magnified view of a portion of the wing taken along line 3 of FIG. 2 and illustrating the flap supported on a drop hinge.

FIG. 2 is a sectional view of a wing 112 showing a flight control surface 114 configured as a flap 116 pivotably coupled to the wing 112 by means of one or more flap fittings 118 incorporating one or more of the presently-disclosed bearing assemblies 302. FIG. 3 is a magnified view of a portion of the wing 112 illustrating a drop hinge 120 extending downwardly from an aft end of the wing 112. The flap 116 includes a flap fitting 118 pivotably coupled to the drop hinge 120. Although the presently-disclosed bearing assembly 302 is described in the context of an aircraft 100, the bearing assembly 302 may be implemented in any application, without limitation, where a conventional bearing may be used. In this regard, the presently-disclosed bearing assembly 302 may be incorporated into any system, subsystem, structure, assembly, subassembly, or component of any vehicular or non-vehicular application.

In some examples, the presently-disclosed bearing assembly 302 may be used as a replacement for a conventional press-fit bearing insert (not shown) that may be removed from a structural hole 208 of a structural component 200. Following the removal of a press-fit bearing insert, the presently-disclosed bearing assembly 302 may be installed into the structural hole 208. The bearing assembly 302 includes a countersink lip 332 (e.g., FIG. 4) configured to be seated on a countersink profile 222 of the structural hole 208 for radially centering and axially fixing the bearing assembly 302 in the structural hole 208. The bearing assembly 302 is mechanically secured to the structural hole 208 by means of a nut 380 threadably engaged to an externally threaded portion 334 (e.g., FIG. 4) of the bearing assembly 302 on a back side 216 of the structural component 200.

Figure 4:
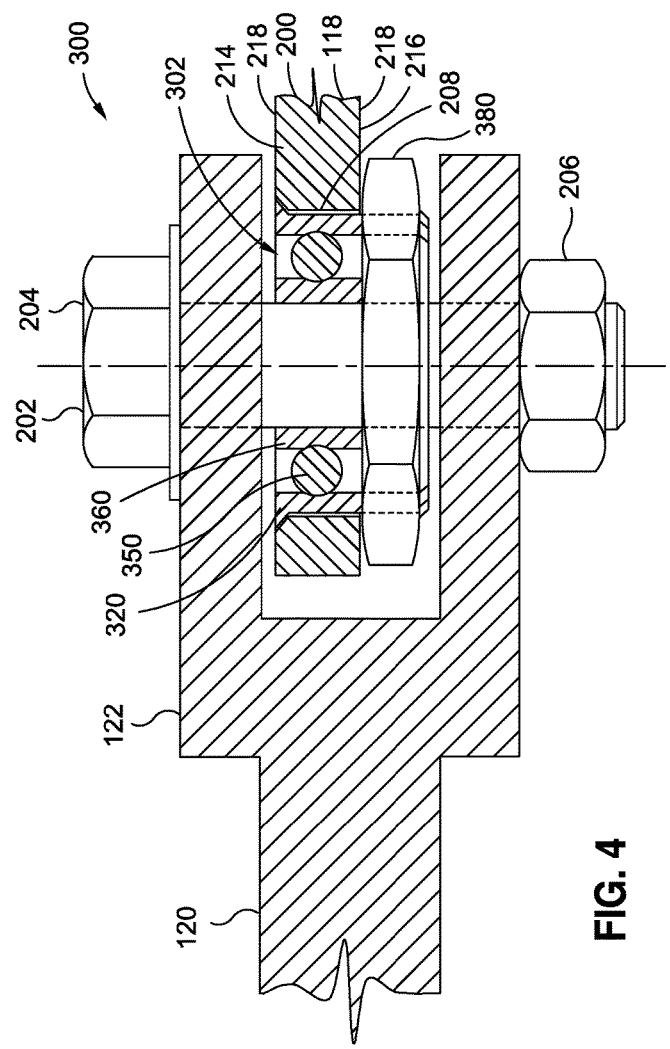
FIG. 4 is a sectional view taken along line 4 of FIG. 3 and illustrating the presently-disclosed bearing assembly installed in a drop hinge pivotably coupling a flap fitting to a drop hinge of a wing.

FIG. 4 is a sectional view of an example of a bearing assembly 302 pivotably coupling the flap fitting 118 to the drop hinge 120 of FIG. 3. The drop hinge 120 is shown having a clevis fitting 122 to which the flap fitting 118 is rotatably coupled via the bearing assembly 302. The flap fitting 118 comprises the structural component 200 into which the bearing assembly 302 is installed. In the present example, the drop hinge 120 comprises a second component to which the structural component 200 (e.g., the first component) is coupled via a bolt 204 extending through the clevis fitting 122 of the drop hinge 120 and through the bearing assembly 302. The bolt 204 may be secured by a fitting nut 206 or other mechanical feature.

Figure 5:
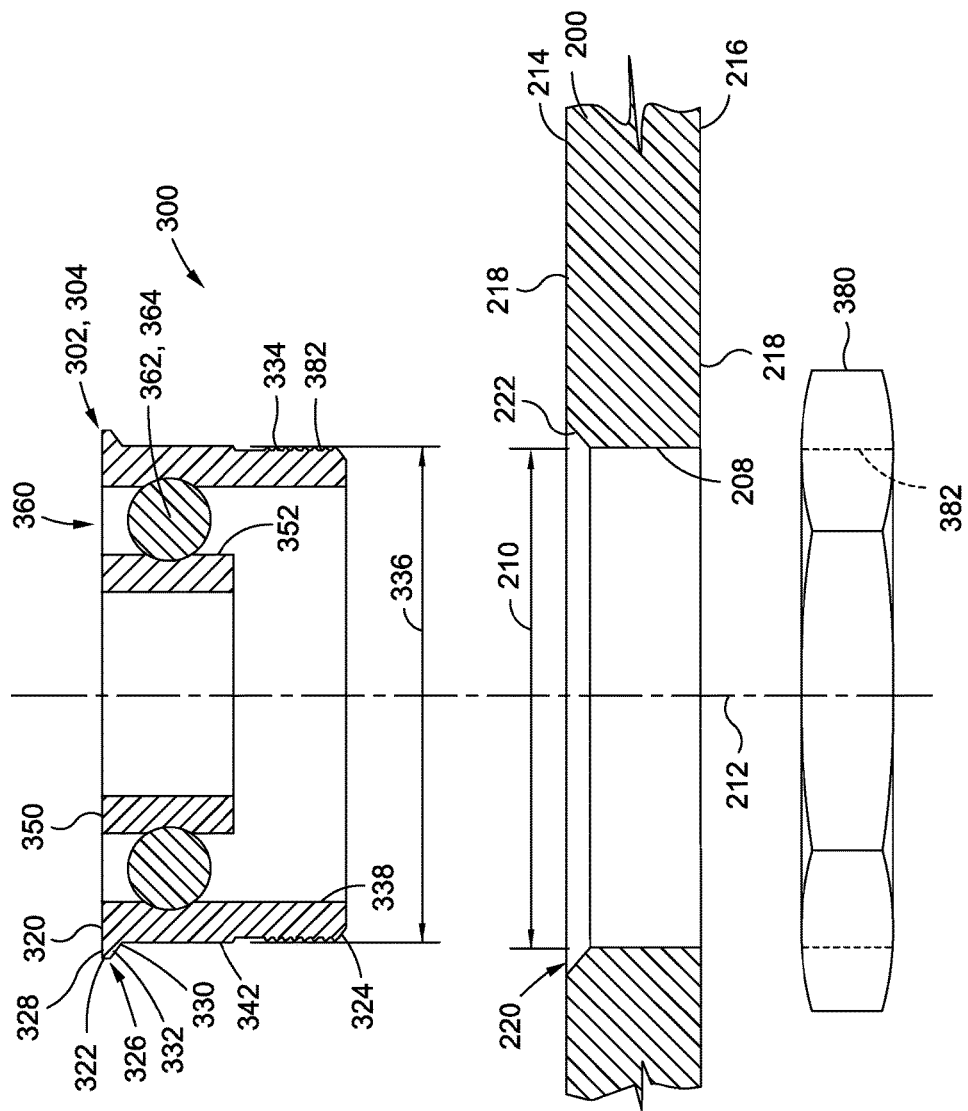
FIG. 5 is an exploded side view of an example of a bearing assembly for installation into a structural hole.

FIG. 5 is an exploded side view of an example of a bearing assembly 302 for installation into a structural hole 208 of a structural component 200. The structural hole 208 has a hole axis 212. In addition, the structural hole 208 has a countersink profile 222 formed on an edge 220 of the structural hole 208 on a front side 214 of the structural component 200. The bearing assembly 302 is installed in the structural hole 208 and is fixed in position by the above-mentioned nut 380 which is threadably secured to the externally threaded portion 334 of the outer race 320 of the bearing assembly 302. As described below, the bearing assembly 302 has a clearance fit with the structural hole 208 allowing the bearing assembly 302 to be freely removable by first removing the nut 380. In this regard, the presently-disclosed bearing assembly 302 advantageously avoids the use of an interference fit or press-fit installation as may be used in conventional bearings. In addition, the presently-disclosed bearing assembly 302 avoids the need for material displacement (e.g., swaging or staking) as may be required for installation of a conventional bearing. In this regard, the presently-disclosed bearing assembly 302 provides a significant reduction in bearing installation cost and complexity.

Referring still to FIG. 5, the bearing assembly 302 includes an outer race 320, an inner race 350, and a bearing interface 360 located between and rotatably coupling the inner race 350 to the outer race 320. The structural hole 208 is formed in the structural component 200 which has a front side 214 and a back side 216. The structural hole 208 may be sized and configured to receive the outer race 320. In this regard, the outer race 320 may have a smaller diameter than the hole diameter 210 of the structural hole 208, as mentioned above. In addition, the structural hole 208 includes the countersink profile 222 on the front side 214 for receiving the complementary-shaped countersink lip 332 of the outer race 320.

In FIG. 5, the outer race 320 includes a cylindrical outer race 320 outer surface which, as mentioned above, may be sized and configured complementary to the hole diameter 210 of the structural hole 208. In one example, the outer race 320 has an outer race 320 outer diameter 336 that is smaller that the hole diameter 210 of the structural hole 208 into which the bearing assembly 302 is installed. In this regard, the outer race 320 may be sized and configured to provide a clearance fit or non-interference fit with the structural hole 208. For example, the hole diameter 210 may be larger (e.g., by up to 0.254 mm, 0.010 inch, or more) than the outer race 320 diameter of the outer race 320 as necessary to allow for installation and to maintain structural adequacy. However, in other examples, the outer race 320 may be sized to provide a slight interference fit within the structural hole 208. In one example, the hole diameter 210 of the structural hole 208 may be substantially equivalent to (e.g., +/−0.254 mm, 0.010 inch) an outer race 320 outer diameter 336.

The outer race 320 has a head end 322 and a base end 324 opposite the head end 322. The head end 322 includes a flange 326 having the countersink lip 332 formed on an underside 330 of the flange 326. The countersink lip 332 is configured complementary to the countersink profile 222 extending around the structural hole 208 on the front side 214 of the structural component 200. In one example, the angles of the countersink lip 332 and the countersink profile 222 may be within the tolerance (e.g., +/−1 degree of one another) necessary to allow for installation and maintain structural adequacy.

Referring still to FIG. 5, the outer race 320 includes the externally threaded portion 334 located adjacent to and terminating at the base end 324. The outer race 320 has a race length 342 described as the distance between the head end 322 and the base end 324. The race length 342 may be sized such that when the bearing assembly 302 is installed in the structural hole 208, the outer race 320 extends beyond the back side 216 of the structural component 200 by an amount allowing the nut 380 to be at least partially threadably engaged to the externally threaded portion 334. In some examples, the outer race 320 length may be such that the externally threaded portion 334 (e.g., the base end 324) is flush with or extends beyond the nut 380.

When the bearing assembly 302 is installed in the structural hole 208, the externally threaded portion 334 of the outer race 320 may extend from the base end 324 (e.g., the free end of the outer race 320) to a location just (e.g., up to 0.762 mm, 0.030 inch) below the back side 216 of the structural component 200 to allow the nut 380 to be tightened or torqued against the back side 216 without bottoming out on the non-threaded portion of the outer race 320. However, in other examples, the externally threaded portion 334 may extend along an entirety of the outer race 320 from the base end 324 to the countersink lip 332. The countersink lip 332 of the outer race 320 and the countersink profile 222 of the structural hole 208 are preferably configured such that when the nut 380 is tightened against the side surface 218, the countersink lip 332 seats uniformly around the circumference of the countersink profile 222.

The bearing assembly 302 also includes the inner race 350 which is circumscribed by or positioned within the outer race 320. The inner race 350 includes a cylindrical inner race 350 inner surface defining a bore for receiving a complementary-sized shaft 202 (e.g., a pin, a bolt, a sleeve, or other elongate cylindrical element). The shaft 202 (e.g., a bolt) may extend through the bore of the inner race 350 similar to the arrangement shown in FIG. 4.

The bearing assembly 302 additionally includes the bearing interface 360 located between and rotatably coupling the inner race 350 to the outer race 320. The bearing interface 360 may be provided in any one a variety of different configurations. For example, the bearing interface 360 may be configured in a ball bearing configuration 304 (FIGS. 6-7), a roller bearing configuration (FIG. 8), a self-aligning bearing configuration 308 (FIG. 9), a spherical bearing configuration 310 (FIG. 10), or any one a variety of other bearing configurations that allow the inner race 350 to rotate freely relative to the outer race 320. The bearing interface 360 may be configured to allow rotation of the inner race 350 relative to the outer race 320 in at least one direction for a one-way bearing, or in opposite directions for a two-way bearing.

The nut 380 may be tightened against the back side 216 of the structural component 200. In this regard, the back side 216 of the structural component 200 may include a locally planar area against which the nut 380 may bear. In some examples, the planar area may be provided by locally machining or spotfacing (not shown) the back side 216 of the structural component 200 in the area surrounding the structural hole 208. In some examples, a washer (not shown) may be installed between the nut 380 and the back side 216 to facilitate tightening or torqueing of the nut 380 against the structural component 200. The nut 380 may be tightened to a tightening torque against the back side 216 of the structural component 200 to provide bearing load transfer capability from the outer race 320 to the structural hole 208. In addition, the tightening of the nut 380 against the back side 216 of the structural component 200 may provide shear load transfer capability from the outer race 320 to the structural component 200 via the engagement of the countersink lip 332 to the countersink profile 222.

Although shown in FIGS. 4-5 as a low-profile hex nut for engagement by a correspondingly-configured tool (not shown) such as an open-end wrench (not shown), the nut 380 may be provided in any one of a variety of configurations that facilitate threadable engagement of the nut 380 onto the externally threaded portion 334 of the outer race 320, and tightening or torqueing of the nut 380 against the back side 216 of the structural component 200. For example, the nut 380 may be provided as a 12-sided nut, or the nut 380 may be provided with a single pair of diametrically-opposed flats. However, the nut 380 may be devoid of flats, and may include one or more other features (e.g., knurls) to facilitate threadable engagement and/or tightening or torqueing of the nut 380 against the back side 216 of the structural component 200.

Referring again to FIG. 4, when the countersink lip 332 of the outer race 320 is seated on the countersink profile 222 of the structural hole 208, the bearing assembly 302 is radially centered in the structural hole 208. In addition, when the nut 380 is tightened against the back side 216 of the structural hole 208, the bearing assembly 302 is axially fixed in the structural hole 208. In addition, the engagement of the countersink lip 332 with the countersink profile 222 of the structural hole 208 advantageously prevents radial movement of the bearing assembly 302.

In some examples, the nut 380 and/or the externally threaded portion 334 may include a locking feature 382 restricting rotation of the nut 380 relative to the outer race 320. The locking feature 382 may be provided as a localized deformation of the nut 380 and/or as a locking patch (e.g., a Nylon™ patch) on the threads of the nut 380 and/or on the externally threaded portion 334 of the outer race 320. In other examples, the locking feature 382 may be provided as a safety pin (not shown) and/or lock wire (not shown) extending through a diametrical hole (not shown) formed in the externally threaded portion 334 and passing through the slots of a castellated nut (not shown).

The outer race 320 may be configured such that an upperside 328 of the flange 326 is flush (e.g., within +/−0.254 mm, 0.010 inch) with the front side 214 of the structural component 200 when the bearing assembly 302 is installed in the structural hole 208 and the nut 380 is tightenedagainst the back side 216 of the structural component 200. However, in some examples, the outer race 320 may be configured such that upperside 328 of the flange 326 protrudes above the front side 214 of the structural component 200, or the upperside 328 of the flange 326 may be below the front side 214 structural component 200.

The outer race 320, the inner race 350, the bearing interface 360, and the nut 380 may be formed of metallic material, non-metallic material, polymeric material, and/or ceramic material. The material of the outer race 320 may be selected to be compatible with the material of the structural component 200 (e.g., to avoid galvanic corrosion). In one example, the outer race 320, the inner race 350, and/or the bearing interface 360 may be formed of stainless steel, hardened steel, carbon chromium steel, or other metallic compositions. Alternatively, the outer race 320, the inner race 350, and/or the bearing interface 360 may be formed of non-metallic material including polymeric material and/or ceramic material, ceramic, plastic, glass, or other non-metallic materials.

Figure 6:
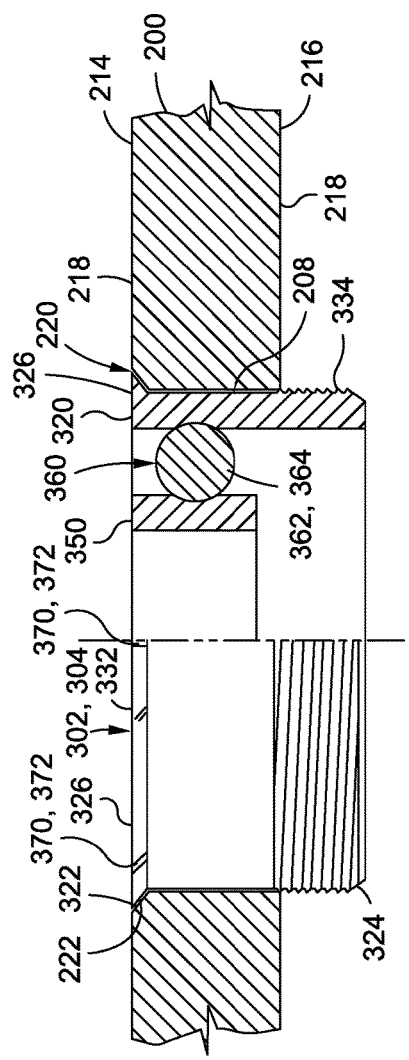
FIG. 6 is a partial sectional view of a ball bearing configuration of the presently-disclosed bearing assembly.

FIG. 6 is a partial sectional view of a bearing assembly 302 installed in a structural hole 208 of a structural component 200, and wherein the bearing interface 360 comprises a plurality of bearing elements 362 captured between the outer race 320 and the inner race 350. In the example shown, the bearing assembly 302 is provided in a ball bearing configuration 304. In the ball bearing configuration 304, the bearing interface 360 includes at least one circular row of ball elements 364. Each one of the ball elements 364 may be spherical or nearly spherical. The plurality of bearing elements 362 may be provided in a single row (FIG. 6), or in two or more rows (not shown) of bearing elements 362.

Figure 7:
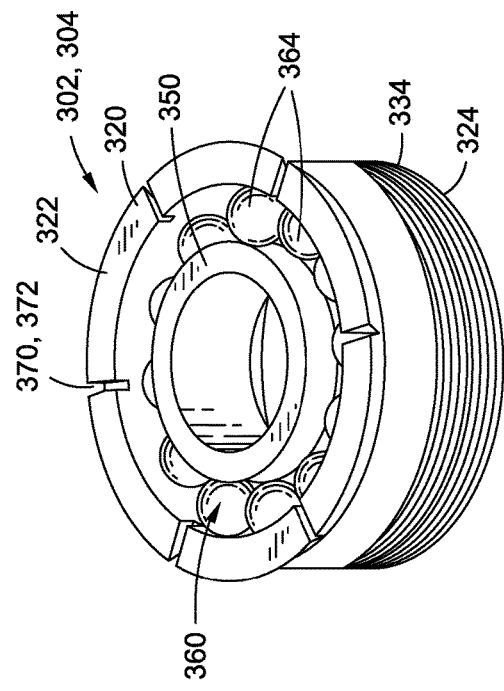
FIG. 7 is a perspective view of the ball bearing configuration of FIG. 6.

FIG. 7 is a perspective view of the ball bearing configuration 304 of FIG. 6 showing an anti-rotation feature 370 that may be included in the flange 326 of the outer race 320 for restricting or preventing rotation of the outer race 320 relative to the nut 380 during engagement of the nut 380 onto the externally threaded portion 334 and/or tightening of the nut 380 against the back side 216 of the structural component 200. In the example shown, the flange 326 has a plurality of spanner slots 372 formed in (e.g. machined, cast, etc.) in the flange 326. The spanner slots 372 may be engaged by a complementary-shaped tool (e.g., a spanner wrench—not shown) to restrict or limit rotation of the outer race 320 relative to the structural component 200 into which the bearing assembly 302 is installed. Although shown as spanner slots 372, the anti-rotation feature 370 may be provided in any one of a variety of configurations for engagement by a tool. In this regard, the anti-rotation feature 370 may be provided as any type of indentation and/or protrusion formed on and/or in the flange 326, the head end 322, and/or the base end 324 of the outer race 320. The anti-rotation feature 370 may configured to receive a complementary-shaped tool for engaging the anti-rotation features 370 and limiting or preventing rotation of the outer race 320 during engagement and/or tightening of the nut 380 against the back side 216 of the structural component 200.

FIG. 8 is a partial sectional view of a further example of the presently-disclosed bearing assembly 302 having a plurality of bearing elements 362 configured as roller elements 366. The roller elements 366 rotatably support the inner race 350 relative to the outer race 320. In the example shown, the bearing assembly 302 is provided in a tapered bearing configuration 306 having a circular row of tapered roller elements 366. Although not shown, the roller elements may optionally be provided as cylindrical roller elements.

FIG. 9 is a perspective view of a self-aligning bearing configuration 308 of the presently-disclosed bearing assembly 302. The self-aligning bearing configuration 308 may include two or more circular rows of bearing elements 362 such as ball elements 364. Although not shown, the bearing assembly 302 may include a cage for maintaining the positions of the roller elements 366 relative to one another during universal pivoting of the inner race 350 relative to the outer race 320.

FIG. 10 is a partial sectional view of an example of a spherical bearing configuration 310 of the present-disclosed bearing assembly 302. In the example shown, the bearing interface 360 comprises a spherical bearing interface 368 including a spherical convex surface 354 formed on the inner race 350 outer surface 352, and a spherical concave surface 340 formed on the outer race 320 inner surface 338. The spherical concave surface 340 is in slidable engaging contact with the spherical convex surface 354 allowing for universal pivoting of the inner race 350 relative to the outer race 320 similar to the pivoting allowed by the self-aligning bearing configuration 308 shown in FIG. 9.

As may be appreciated, the bearing assembly 302 may be provided in any one of a variety of bearing assembly configurations where the outer race 320 has a countersink lip 332 for seating on a countersink profile 222 of the structural hole 208, and including a nut 380 for threadable engagement onto an externally threaded portion 334 (e.g., FIG. 4) of the outer race 320. As mentioned above, the outer race 320 may have a clearance fit with the structural hole 208 to facilitate installation and removal of the bearing assembly 302 without the need for press-fitting or for material displacement (e.g., staking) to retain the bearing assembly 302 in the structural hole 208. In this regard, the presently-disclosed bearing assembly 302 provides for ease of installation and replacement through elimination of interference fits and/or staking retention methods. Furthermore, the countersink lip 332 on the outer race 320 facilitates installation of the bearing assembly 302 in locations not otherwise conducive to installation of conventional bearings due to sloped surfaces (not shown) of the structural component 200, and/or due to tight confines or inaccessible locations.

Figure 11:
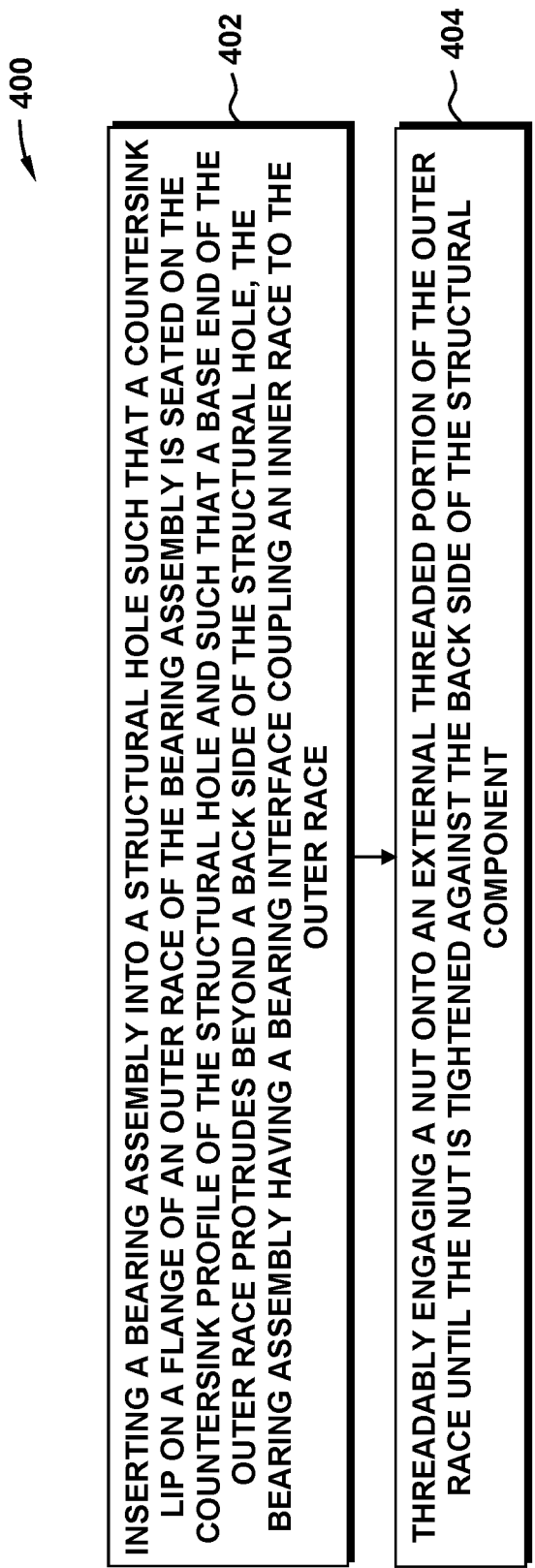
FIG. 11 is a flowchart having one or more operations included in a method of installing a bearing assembly into a structural hole.

FIG. 11 is a flowchart having one or more operations included in a method 400 of installing a bearing assembly 302 into a structural hole 208 of a structural component 200. Step 402 of the method 400 includes inserting a bearing assembly 302 into a structural hole 208, such as is shown in FIG. 4. As mentioned above, the outer race 320 has an outer race 320 outer diameter 336 that may be smaller that the hole diameter 210 of the structural hole 208 into which the bearing assembly 302 is installed. In this regard, the outer race 320 may provide a non-interference fit within the structural hole 208. The bearing assembly 302 may be installed in the structural hole 208 such that the countersink lip 332 of the outer race 320 is seated on the countersink profile 222 of the structural hole 208. The base end 324 of the outer race 320 may protrude beyond the back side 216 of the structural hole 208.

Step 404 of the method 400 includes threadably engaging a nut 380 onto the externally threaded portion 334 of the outer race 320. In some examples, the nut 380 may be threaded onto the externally threaded portion 334 until the nut 380 physically contacts the back side 216 of the structural component 200. In other examples, one or more washers (not shown) or other layer of material (not shown) may be installed between the nut 380 and the back side 216 of the structural component 200. The nut 380 may be tightened to a predetermined torque against the back side 216 of the structural component 200 while restricting or preventing rotation of the outer race 320 using the anti-rotation feature 370. The nut 380 may be tightened to a tightening torque to axially and radially fix the bearing assembly 302 relative to the structural hole 208, and thereby provide the capability for bearing load transfer from the outer race 320 to the structural hole 208, and/or shear load transfer capability from the countersink lip 332 to the countersink profile 222 of the structural hole 208.

The step of threadably engaging the nut 380 onto the externally threaded portion 334 may include using a tool (not shown) to engage one or more anti-rotation features 370 of the outer race 320, and restricting or preventing rotation of the outer race 320 relative to the nut 380 during engagement of the nut 380 onto the externally threaded portion 334 and/or tightening of the nut 380 against the back side 216 of the structural component 200. As mentioned above, in some examples, the flange 326 of the outer race 320 may include a plurality of spanner slots 372 for engagement by a tool (e.g., a spanner wrench—not shown).

As mentioned above, the bearing assembly 302 includes a bearing interface 360 coupling the inner race 350 to the outer race 320. The bearing interface 360 may include a plurality of bearing elements 362 captured between the outer race 320 and the inner race 350 and configured one or more circular rows of ball elements 364 or roller elements 366 (e.g., tapered or cylindrical). In another example, the bearing interface 360 may be configured as a spherical bearing interface 368 including a spherical convex surface 354 formed on an inner race 350 outer surface 352, and a spherical concave surface 340 formed on an outer race 320 inner surface 338 for slidably engaging the spherical convex surface 354.

After the nut 380 is installed on the externally threaded portion 334 of the outer race 320 and/or tightened against the back side 216 of the structural component 200, the method 400 may additionally include restricting rotation of the nut 380 relative to the outer race 320 using a locking feature 382 that may be provided with the nut 380 and/or the externally threaded portion 334. As mentioned above, the locking feature 382 may be provided as a localized deformation of the nut 380, a locking patch on the threads of the nut 380 and/or externally threaded portion 334, lock wire or safety pin passing through a castellated nut 380 and a diametrical hole extending through the externally threaded portion 334, or any other means for restricting rotation of the nut 380 relative to the outer race 320.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A bearing assembly, comprising:
an outer race having an outer surface, a head end, and a base end, the outer surface sized and configured to provide a clearance fit with a structural hole of a structural component, the head end including a flange having a countersink lip formed on an underside of the flange, the outer race including an externally threaded portion terminating at the base end, the countersink lip configured complementary to a countersink profile formed on an edge of the structural hole;
an inner race circumscribed by the outer race;
a bearing interface located between and rotatably coupling the inner race to the outer race, the bearing interface including one of tapered roller elements and cylindrical roller elements captured between the inner race and the outer race;
a nut configured to be threadably engaged to the externally threaded portion and configured to bear against a locally planar area on a back side of the structural component; and
the nut configured to be torqued against the back side of the structural hole in a manner such that the combination of the engagement of the countersink lip with the countersink profile and the torqueing of the nut against the back side prevents radial movement of the bearing assembly, thereby allowing for shear load transfer capability from the countersink lip to the countersink profile.

2. The bearing assembly of claim 1, wherein:
the outer race includes an anti-rotation feature for restricting rotation of the outer race relative to the nut.

3. The bearing assembly of claim 2, wherein:
the anti-rotation feature comprises spanner slots formed in an upperside of the flange.

4. The bearing assembly of claim 1, wherein:
at least one of the nut and the externally threaded portion has a locking feature restricting rotation of the nut relative to the outer race.

5. The bearing assembly of claim 1, wherein:
at least one of the outer race, the inner race, and the bearing interface is formed of stainless steel, hardened steel, or carbon chromium steel.

6. A bearing installation, comprising:
a structural component having a structural hole including a countersink profile formed on an edge of the structural hole on a front side of the structural component;
a bearing assembly installed in the structural hole and including:
an outer race having an outer surface, a head end, and a base end, the outer surface sized and configured to provide a clearance fit with the structural hole, the head end including a flange having a countersink lip formed on an underside of the flange and configured complementary to the countersink profile, the outer race including an externally threaded portion terminating at the base end;
an inner race circumscribed by the outer race;
a bearing interface located between and rotatably coupling the inner race to the outer race, the bearing interface including one of tapered roller elements and cylindrical roller elements captured between the inner race and the outer race; and
a nut configured to be threadably engaged to the externally threaded portion and configured to bear against a locally planar area on a back side of the structural component; and
the nut configured to be torqued against the back side of the structural hole in a manner such that the combination of the engagement of the countersink lip with the countersink profile and the torqueing of the nut against the back side prevents radial movement of the bearing assembly, thereby allowing for shear load transfer capability from the countersink lip to the countersink profile.

7. The bearing installation of claim 6, wherein:
the outer race includes an anti-rotation feature for restricting rotation of the outer race relative to the nut during engagement of the nut onto the externally threaded portion.

8. The bearing installation of claim 7, wherein:
the anti-rotation feature comprises spanner slots formed in an upperside of the flange.

9. The bearing installation of claim 6, wherein:
the outer race is configured such that an upperside of the flange is flush with the front side of the structural component when the bearing assembly is installed in the structural hole and the nut is tightened against a back side of the structural component.

10. The bearing installation of claim 6, wherein:
at least one of the nut and the externally threaded portion has a locking feature restricting rotation of the nut relative to the outer race.

11. A method of installing a bearing assembly in a structural component, comprising:
inserting a bearing assembly into a structural hole such that an outer surface of an outer race of the bearing assembly has a clearance fit with the structural hole, and such that a countersink lip of the outer race is seated on a countersink profile formed on an edge of the structural hole, and such that a base end of the outer race protrudes beyond a back side of the structural hole, the bearing assembly having a bearing interface coupling an inner race to the outer race, the bearing interface including one of tapered roller elements and cylindrical roller elements captured between the inner race and the outer race;
threadably engaging a nut onto an externally threaded portion protruding beyond a back side of the structural component; and
torqueing the nut against a locally planar area on the back side of the structural component in a manner such that the combination of the engagement of the countersink lip with the countersink profile and the torqueing of the nut against the back side prevents radial movement of the bearing assembly, thereby allowing for shear load transfer capability from the countersink lip to the countersink profile.

12. The method of claim 11, wherein the step of threadably engaging a nut onto the externally threaded portion includes:
    engaging an anti-rotation feature of the outer race; and
    restricting rotation of the outer race relative to the nut during engagement of the nut onto the externally threaded portion.

13. The method of claim 12, wherein the step of engaging an anti-rotation feature of the outer race comprises:
    engaging spanner slots formed in a flange of the outer race.

14. The method of claim 11, further including the step of:
    restricting rotation of the nut relative to the outer race using a locking feature provided with at least one of the nut and the externally threaded portion.

15. The method of claim 11, further including:
    installing the bearing assembly such that an upperside of a flange of the outer race is flush with a front side of the structural component when the bearing assembly is installed in the structural hole and the nut is tightened against the back side of the structural component.

\* \* \* \* \*